May 27, 1930.  R. B. COFFMAN  1,760,116
DRAG SCOOP
Filed Aug. 5, 1929
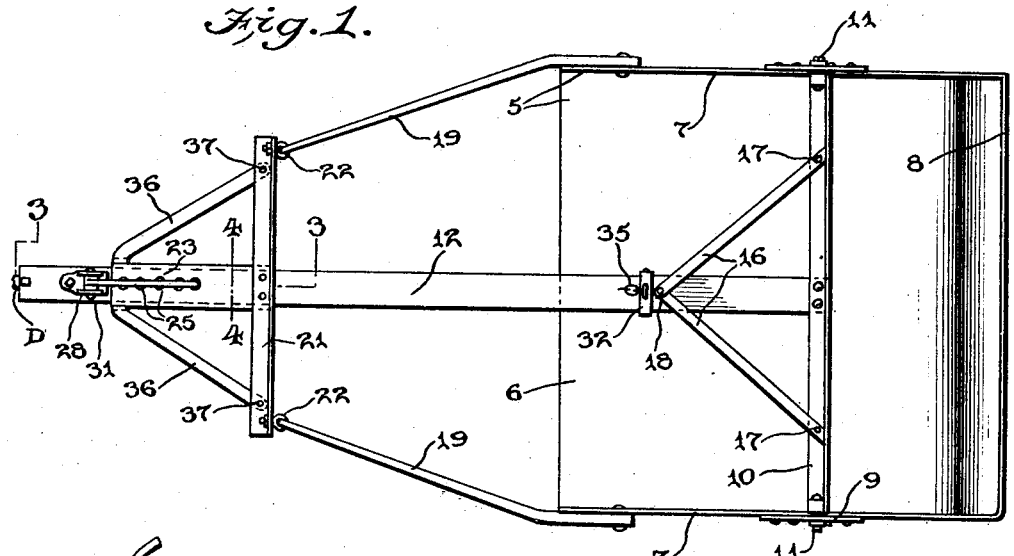
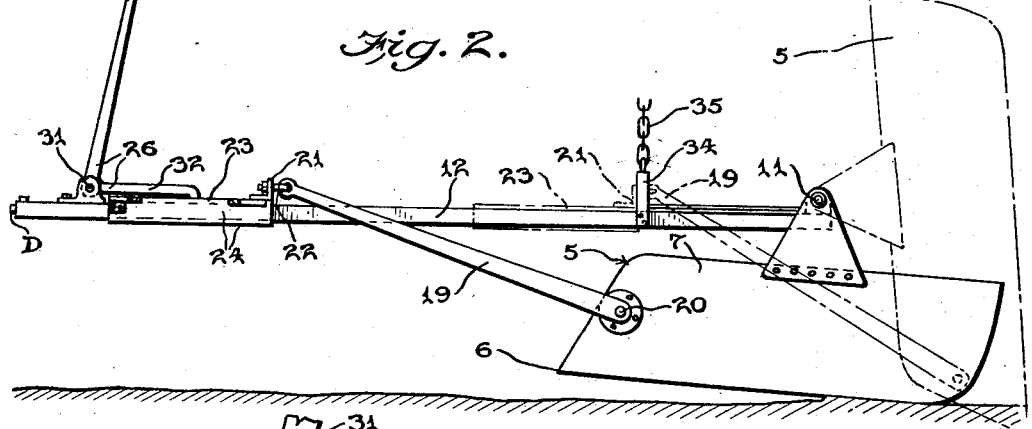
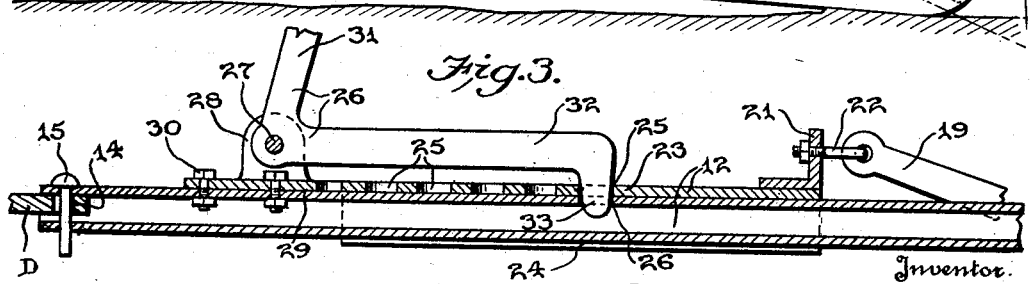
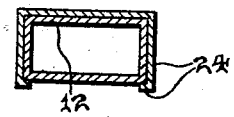
Inventor
Robert B. Coffman,
By Sterling P. Buck,
Attorney.

Patented May 27, 1930

1,760,116

UNITED STATES PATENT OFFICE

ROBERT B. COFFMAN, OF NEW ALEXANDRIA, PENNSYLVANIA

DRAG SCOOP

Application filed August 5, 1929. Serial No. 383,726.

This invention relates to scoops, and especially to an improved drag-scoop.

One object of this invention is to provide a scoop of this character which is attachable to a tractor or other pulling means and which is of such novel construction that it can be automatically dumped upon releasing a locking device or catch which holds it in its operative position.

Another object of the invention is to provide a scoop of this character with a draught-beam having means to hitch it to the draught-lug of a tractor, and having an adjusting member slidable thereon, and having a second adjusting member pivoted thereon and provided with a handle which is operable to adjust it with respect to the slidable adjusting member.

Another object is to provide a scoop of this character with a lifting member secured to the draught-beam and adapted for connection to a hoist or lifting device, this lifting member being in the proper position to serve as a stop for limiting the rearward sliding movement of the slidable adjusting member on the draught-beam.

Another object is to provide a scoop of this character including a scoop-pan which is automatically returned to its operative position, from its dumping position, upon backing the scoop a short distance.

Another object is to provide a scooping device of this character which is composed of a comparatively few and simple parts, so that its cost is reduced to the minimum, with respect to its initial production, and its upkeep.

Other objects and important features are pointed out or implied in the following details of description, in connection with the accompanying drawings in which:

Figure 1 is a top plan view of my improved scoop or scooping device.

Figure 2 is a side elevation, the scoop-pan being shown in one of its adjusted positions while the slidable adjusting member is in its foremost position; the broken lines representing an intermediate adjustment of the scoop-pan and its adjuncts.

Figure 3 is an enlarged detail central sectional view along the line 3—3 of Figure 1.

Figure 4 is a detail cross-sectional view.

Referring to these drawings in detail, in which similar reference characters correspond to similar parts in the several views, and in which the draught-lug of the tractor is shown at D, for showing how the scoop is drawn or dragged, the invention is now described in detail as follows:

The scoop-pan 5 has a horizontal front edge 6 which enters the ground when in the proper position and when drawn or dragged, so as to fill the scoop-pan. The scoop-pan is formed with side walls 7 and with a rear wall 8. Supporting plates or ears 9 are riveted or otherwise secured on the respective walls 7, and to the upper ends of these members 9, a cross-beam or length of angle-iron 10 is pivotally secured by means of bolts 11 or other appropriate means. A substantially horizontal beam 12 is secured to the middle of the beam 10 and extends forward over the scooping edge 6 and for a considerable distance beyond the latter. This beam 12 is preferably a hollow box-beam. A bolt or coupling pin 15 extends through the alined apertures of the beam 12 and through an aperture 14 of the drawbar or lug D, so the latter supports the front end of the beam 12. Brace bars or struts 16 have their rear ends secured by bolts or rivets, at 17, while their front ends are secured to the beam 12, as indicated at 18.

Two links 19 have their rear ends pivotally secured to the front parts of the walls 7, where indicated at 20, while their front ends are pivotally connected to a cross-beam 21 through the medium of eye-bolts 22. The middle part of the beam 21 is riveted or otherwise secured to a sliding member 23 which is mounted on the beam 12 and provided with downwardly and inwardly turned flanges 24 which prevent lateral and vertical displacement of the sliding member by permitting it to move forward and rearward when not restrained against such movement. This member 23 is provided with a longitudinal series of apertures 25, and the member 12 is provided with an aperture 26 in the position to be in or out of registration with the respective apertures 25, according to the adjustment of the latter on the beam 12. A lever 26 is pivotally mounted at 27, the ends of the pivot 27 being supported by upstanding ears 28 of a bracket 29 which is secured on the beam 12 by means of bolts or other securing means 30. The lever 26 includes a handle member 31 and a latch member 32, the latter having a depending end 33 which extends through the aperture 26 and through any one of the apertures 25, so as to securely hold the sliding member 23 in any one of its adjusted positions. It will be seen that the weight of the arm 32 normally holds the latch-member 32 in its effective position. However, by pulling the handle member 31 forward, the latch-member is released from the openings or apertures of the members 12 and 23, and the sliding member is free to slide forward to the position shown in full lines, and rearward to the position shown in broken lines in Figure 2. In this connection, it should be understood that the full-line position is obtained by backing the device while the lever 26 is released from the member 23; and now, by moving the lever 26 into its effective position shown in the drawings, the scoop is held in this position so the device can be drawn forward without scooping dirt into the scoop-shovel or pan 5. When drawn forward while in this position, the rear part of the scoop-shovel tends to level the ground over which it is drawn. On the other hand, if the device is drawn forward while the lever 26 is released from the member 23, the latter will slide rearward, so that the scooping edge 6 engages with the ground, and a continued forward movement causes the scoop-shovel or pan 5 to turn into the position shown by broken lines in Figure 2. A yoke or lifting member 34 straddles the beam 12 and is secured to the opposite vertical sides thereof, and performs the dual functions of a lifting member and of a stop against which the cross-beam 21 is seated when the scoop is in its broken-line position. The broken-line position is the dumping position of the scoop-shovel, and if moved forward when in this position, it spreads and tends to level the material which has been dumped therefrom. It is noted that the bottom of the scoop-shovel is downwardly and rearwardly inclined when in the dumping position, and it should be understood that its inclination may be more or less, according to the desires of the designer and builder of devices of this kind.

Referring again to the lifting member 34, it will be seen that a chain or flexible element 35 is secured to the middle upper part thereof, and is broken away in these drawings. The members 34 and 35 constitute a lifting connection which may be connected to any appropriate lifting device, for lifting the rear part of the beam 12, and thereby lifting the scoop-shovel so it will not drag on the ground when being moved forward. In this connection, attention is directed to my pending application Serial Number 367,469, filed May 31, 1929, for Hoisting devices. A scoop of this kind is shown in the drawings of said pending application, but not claimed therein.

Referring again to the broken line position shown in Figure 2, it should be understood that the scoop-shovel can be returned to its full line position, either by backing the device, or by lifting the rear end of the beam 12, whereupon the scoop-shovel will be turned on its pivots 11, and will push the sliding member 23 forward into position to be engaged by the latch-member 32.

For strengthening and bracing the front part of the device, two brace bars or struts 36, have their front ends secured to the front end of the member 23, while their rear ends are secured to the outer end portions of the cross-beam 21, as indicated at 37.

Although I have described this embodiment of my invention specifically, it is not my intention to limit my patent protection to these exact details of construction and arrangement, for the invention is susceptible of numerous changes within the scope of the inventive ideas as implied and claimed.

What I claim as my invention is:

1. In a drag-scoop, the combination of a scoop-pan including side-walls provided with upwardly extending ears, a cross-beam pivotally connected to said ears, a draught-beam having its rear end secured to said cross-beam, a sliding member on said draught-beam, means including links to connect said scoop-pan to said sliding member, means on said draught-beam to limit the rearward movement of said sliding member and thereby limit the pivotal movement of the scoop-pan from its approximately level position to an approximately vertical dumping position, and means to hold said sliding member in different adjustments on the draught-beam and to release the sliding member for permitting it to slide forward and rearward.

2. In a drag-scoop, the combination of a scoop-pan having upwardly extending side members, a draught-beam, means pivotally connecting said draught-beam to said upwardly extending side members, a sliding member on said draught-beam, means including links for movably connecting the front end of the scoop-pan to said sliding member, means to hold the sliding member in different positions on the draught-beam and to release the latter so it is free to slide rearward while the scoop-pan turns on its pivotal connections, and connecting means secured to the rear part of said draught-beam and extending upward therefrom and adapted for connection with a hoisting means for raising the scoop-pan.

3. In a drag-scoop, the combination of a scoop-pan, a draught-beam, means to pivotally connect the scoop-pan to the draught-beam, a sliding member on the draught-beam, a cross-beam on said sliding member, a pair of links having their front ends pivotally connected to said cross-beam while their rear ends are pivotally connected to said scoop-pan, and a lever pivotally mounted on said draught-beam and including an upright part and a rearwardly extending part, the latter having a down-turned end, said sliding member having openings to receive the said down-turned end, whereby the sliding member can be held in different adjustments, substantially as shown and specified.

4. In a drag-scoop, the combination of a scoop-pan provided with upwardly extending apertured side portions, a cross-beam, pivots extending through the apertured side portions and securing the ends of said cross-beam to the scoop-pan, a draught-beam, a sliding member having downwardly and inwardly extending flanges embracing the sides of the draught-beam to prevent lateral and upward movements while being movable forward or rearward on the draught-beam, means to releaseably hold said sliding member in different forward positions for adjusting the scoop-pan about its pivotal connections, and means to limit the rearward movement of the sliding member and thereby prevent the scoop-pan from turning beyond a predetermined dumping position.

5. In a drag-scoop, the combination of a scoop-pan, a draught-beam, means pivotally connecting the scoop-pan to the draught-beam, a sliding member on the draught-beam, a latch-member for holding the sliding member in different forward positions, a handle mounted on the draught-beam and extending upward therefrom and operable to release the sliding member from the latch-member, means connecting the sliding member with the front end of the scoop-pan and permitting the latter to turn to its dumping position while the sliding member slides rearward on the draught-beam, and means on the draught-beam for limiting the rearward movement of said sliding member and for connecting with a hoisting means for raising the rear end of the draught-beam and thereby raising the scoop-pan.

In testimony whereof I affix my signature.

ROBERT B. COFFMAN.